United States Patent [19]

Horak et al.

[11] 4,124,505
[45] Nov. 7, 1978

[54] DEGRADATION OF ORGANIC COMPOUNDS IN EFFLUENTS BY WET OXIDATION

[75] Inventors: Otto Horak, Cologne; Hans-Ulrich Alles, Blecher; Walter Horstmann, Schildgen; Knut Hammerström, Leverkusen; Ruthard Potthast, Cologne, all of Germany

[73] Assignee: Bayer Aktiengesellschaft, Leverkusen, Germany

[21] Appl. No.: 748,074

[22] Filed: Dec. 6, 1976

[30] Foreign Application Priority Data

Dec. 10, 1975 [DE] Fed. Rep. of Germany ....... 2555536
Dec. 31, 1975 [DE] Fed. Rep. of Germany ....... 2559374

[51] Int. Cl.² .................................................. C02C 5/04
[52] U.S. Cl. .................................................. 210/63 R
[58] Field of Search .................. 210/50, 63 R, 63 Z

[56] References Cited

U.S. PATENT DOCUMENTS

| 3,186,942 | 6/1965 | Benger | 210/63 R |
| 3,819,516 | 6/1974 | Murchison et al. | 210/63 R |
| 3,912,626 | 10/1975 | Ely et al. | 210/63 R |
| 3,939,072 | 2/1976 | LaForte | 210/96 R |
| 4,000,068 | 12/1976 | Nelson et al. | 210/50 |

*Primary Examiner*—Thomas G. Wyse
*Attorney, Agent, or Firm*—Sprung, Felfe, Horn, Lynch & Kramer

[57] ABSTRACT

In the degradation of organic compounds in an effluent by oxidizing the effluent at an elevated temperature with oxygen, the improvement which comprises effecting the oxidation at a redox potential of from about 300 to 600 millivolts, as measured with a platinum electrode against a silver-silver chloride electrode, at a temperature of from about 80° to 250° C and under a pressure of from about 30 to 200 bars. The redox potential may be maintained by an $Fe^{2+}$ and/or $Fe^{3+}$ ion system and the pH is advantageously below about 7.

8 Claims, 1 Drawing Figure

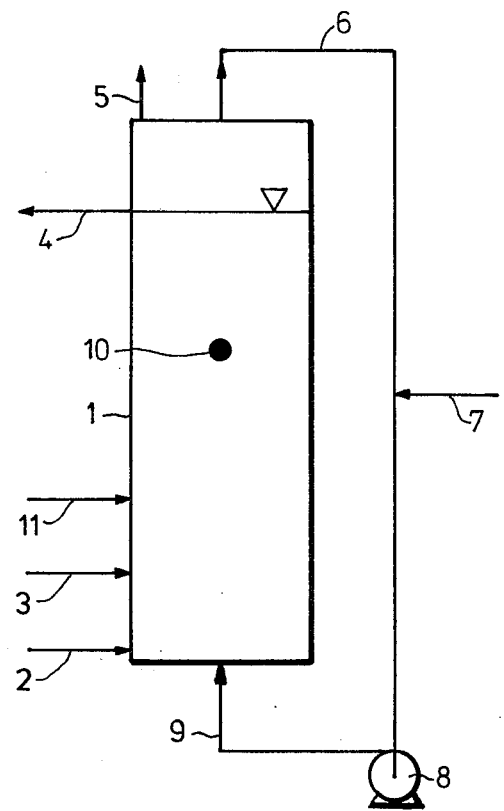

DEGRADATION OF ORGANIC COMPOUNDS IN EFFLUENTS BY WET OXIDATION

Effluents containing organic substances are formed in industry. In a few special cases, the organic substances are removed from the effluent by extraction, absorption or treatment with oxidizing agents, although effluents containing biodegradable organic substances are generally treated in biological purification plants. However, it is known that a large number of organic compounds, for example various aromatic compounds, especially derivatives of benzene, naphthalene and anthracene, cannot be biologically degraded by bacteria. One known process for degrading organic compounds such as these, which it is difficult, if not impossible, to degrade biologically, is the wet oxidation or wet incineration process. In this process, the effluent containing organic substances is heated to temperatures of up to 350° C. and at the same time contacted with oxygen-containing gases at pressures in the range of from 150 to 250 bars. Under these conditions, the hydrocarbons, for example, are almost completely oxidized into $CO_2$, $CO$ and $H_2O$, depending upon the temperature. Unfortunately, this process has a high energy consumption as a result of the high temperatures required. Another problem of this known process resides in the materials of construction because only a few materials withstand corrosion at the high temperatures required, especially in the presence of chloride ions.

The object of the present invention is to obviate the disadvantages attending the conventional wet oxidation process and in particular to enable wet oxidation of the organic substances present in the effluent to be carried out at lower temperatures and pressures.

Accordingly, the present invention relates to a process for the degradation by wet oxidation of organic compounds in effluents at elevated temperatures, distinguished by the fact that the effluent is oxidized with oxygen, alone or mixed with other gases, at a redox potential of from about 300 to 600 millivolts, at temperatures in the range of from about 80° to 250° C. and at pressures of from about 3 to 200 bars.

It has been found that, in the oxidation of the effluent laden with organic compounds in the redox potential range according to the invention, the temperatures and pressures required for oxidation can be considerably reduced. The redox potential values quoted are based on a measurement which, for technical reasons, is carried out with a platinum electrode with an Ag/AgCl-reference electrode outside the reaction vessel under normal pressure in a sample stream cooled to between about 20° and 50° C. (~10–50 l/h). The redox potential range of from about 350 to 450 millivolts is particularly preferred for the wet oxidation process according to the invention. Redox systems suitable for adjusting the redox potential according to the invention are, for example, $Fe^0/Fe^{2+}$, $Fe^{2+}/Fe^{3+}$, $Co^{2+}/Co^{3+}$, $Cu^{2+}/Cu^+$, $Mn^{3+}/Mn^{2+}$, $Mo^{3+}/Mo^{5+}$, $Ni^{2+}/Ni^{4+}$, $Pb^{2+}/Pb^{4+}$, $Sb^{3+}/Sb^{5+}$, $Os^{4+}/Os^{8+}$, $Mo^{3-}/Mo^{2-}$, $V^{5+}/V^{4+}$, $V^{5+}/V^{3+}$, $H_2O_2/H_2O$, $Mn^{4+}/Mn^{2+}$, $Mn^{7+}/Mn^{2+}$, $Mn^{7+}/Mn^{4+}$, $Ni^{4+}/Ni^{3+}$, $S_2O_8^{2-}/2SO_4^{2-}$, $Ti^{2+}/Ti^{4+}$, $Cl^{5+}/Cl^{7+}$, $Cl^{7+}/Cl^-$, $Cl^{5+}/Cl^-$, $Cl^+/Cl^-$, $Cr^{6+}/Cr^{3+}$, $Ce^{4+}/Ce^{3+}$, optionally even in combination. According to the invention, it is preferred to use redox systems such as, for example, $S_2O_8^{2-}/2SO_4^{2-}$, $Cl^{7+}/Cl^-$, $Cl^+/Cl^-$, $Mn^{4+}/Mn^{2+}$, and it is particularly preferred to use $Fe^{2+}/Fe^{3+}$. Quantities of iron of less than about 1% by weight, based on the effluent to be treated, are generally sufficient for this purpose. The most preferred catalyst system consists in a redox system containing about 300–500 ppm $Fe^{2+}/Fe^{3+}$ plus about 1–10, preferably 4–7 ppm P in the form of $PO_4^{3-}$ (values based on the effluent to be treated). Oxidation with gases containing oxygen, for example air, preferably with oxygen-enriched air and, more especially, with technically pure oxygen is preferably carried out at temperatures in the range of about 100° to 250° C. and, with particular preference, at temperatures in the range of about 150° to 230° C., and under pressures of from about 10 to 100 bars and, with particular preference, under pressures of about 20 to 60 bars. The wet oxidation of the organic substances present in the effluent in accordance with the invention is preferably carried out in the acid pH-range of below pH 7 and, with particular preference, at pH-values below about 2.

In one preferred embodiment of the process according to the invention, wet oxidation of the effluent is carried out in the presence of up to about 50% by volume, preferably about 5 to 10% by volume, based on the effluent to be oxidized, of already oxidized effluent which is recycled into the wet oxidation process.

The process according to the invention is particularly suitable for the treatment of effluents of the type which accumulate in the production of dyes, plant protection agents, pharmaceuticals, rubber, plastics, lacquers and their intermediate products.

The effluents may contain, either individually or in any combination, aliphatic, alicyclic, aromatic and/or heterocyclic compounds such as, for example, alcohols, ketones, amino acids, fatty acids, esters, acid amides, halogenated hydrocarbons, phosphoric acid esters, alkyl and aryl sulfonic acids, nitriles, aromatic nitro compounds, aromatic amines, azo compounds, anthraquinone and anthracene compounds. The process according to the invention is particularly suitable for working up in organic acids, especially sulfuric acid, laden with organic compounds such as those which accumulate, for example, in the manufacture of dyes.

One particular embodiment of the process according to the invention is described in detail hereinbelow with reference to the accompanying drawing which is a schematic illustration of an apparatus for carrying out the process. The reference numerals appearing in the drawing identify the following elements:

1. Bubble column
2. Effluent input
3. Redox system input
4. Outlet for oxidized effluent
5. Exhaust gas pipe
6. Gas circulation pipe
7. Input of oxygen-containing gas
8. Gas recirculation pump
9. Input of oxygen-containing gas
10. Measuring point for determining redox potential
11. Acid input Referring now more particularly to the drawing, the effluent laden with organic substances is delivered to the bubble column 1 by way of the feed pipe 2 at the base of the bubble column. Oxygen, introduced by way of the pipe 7 and the gas recirculation pump 8, is introduced by way of the pipe 9 at the bottom of the bubble column, optionally via a dispersion unit (not shown). A redox system is introduced through the pipe 3 in quantities such that the potential, as measured at the measuring point 10, is in the range according to the invention. The oxidized effluent leaves the bubble column by way of the pipe 4, the waste gas formed being removed by way of the pipe 5. The oxygen-containing gas is recirculated through the pipe 6. Oxygen is introduced through the pipe 7 in such quantities that an excess of about 10% to 50% is obtained, based on the chemical oxygen demand of the effluent to be treated. An acid pH-range may be established in the effluent to be treated by means of inorganic acids such as, for example, sulfuric acid and phosphoric acid. It is particularly preferred to use organically charged effluents containing sulfuric acid.

By comparison with the known wet oxidation process, oxidation takes place at much lower temperatures and pressures in the process according to the invention. Thus, the consumption of energy is considerably lower by comparison with the known process. Since oxidation is preferably carried out in an acid pH-range, it is possible to use steel-enamelled apparatus.

The invention is illustrated by the following Examples.

EXAMPLE 1

The oxidation of 7 liters of an effluent from the production of H-acid, which contains naphthalene derivatives and has a total organic carbon content of 22 g/l, was carried out in an autoclave at a temperature of 215° C., a pressure of 30 bars, a pH-value of 1.2 and a redox potential of 410 millivolts (measured with a platinum electrode against a silver-silver chloride electrode) and with an oxygen throughput of about 300 normal liters of oxygen per hour. The redox potential was established by the addition of 10 g of $Fe_2(SO_4)_3.9H_2O$. After 2 hours, the total organic carbon content in the effluent thus treated amounted to only 1.5 g/l.

EXAMPLE 2

In an installation of the kind shown in the accompanying drawing, 150 l/h of an effluent from the manufacture of salicyclic acid, which contained benzene derivatives and had a total organic carbon content of 13.5 g/l, were oxidized at a temperature of 130° C., a pressure of 5 bars, a pH-value of 1 and a redox potential of 450 millivolts (measured as in Example 1) and with an oxygen throughput of 4.5 normal cubic meters per hour. The redox potential was established by the addition of 0.5 kg/h of $Fe_2(SO_4)_3.9H_2O$ dissolved in water. After a treatment time of 20 minutes, the effluent thus treated had a total organic carbon content of only 7.5 g/l.

EXAMPLE 3

In an installation of the kind shown in the accompanying drawing, 150 l/h of a production effluent from the manufacture of the dye 4,4'-diaminodianthrimide, which contained antracene derivatives and had a total organic carbon content of 2.15 g/l, were oxidized at a temperature of 143° C., a pressure of 5 bars a pH of 1 and a redox potential of 420 millivolts (measured as in Example 1), and with an oxygen throughput of 1 normal cubic meter per hour. The redox potential was established by the addition of 0.3 kg/h of $Fe_2(SO_4)_3.9H_2O$ dissolved in water. After a treatment time of 20 minutes, the effluent thus treated had a total organic carbon content of 0.62 g/l.

It will be appreciated that the instant specification and examples are set forth by way of illustration and not limitation, and that various modifications and changes may be made without departing from the spirit and scope of the present invention.

What is claimed is:

1. In the degradation of organic compounds in an effluent by oxidizing the effluent at an elevated temperature with oxygen, the improvement which comprises effecting the oxidation at a redox potential of from about 350 to 450 millivolts, as measured with a platinum electrode against a silver-silver chloride electrode, at a pH below about 2, a temperature of from about 80° to 250° C. and under a pressure of from about 3 to 200 bars, the redox potential being maintained by a catalyst system comprising $Fe^{2+}$ and $Fe^{3+}$.

2. A process as claimed in claim 1, wherein the effluent is oxidized at a temperature of from about 100° to 250° C.

3. A process as claimed in claim 1, wherein the effluent is oxidized at a pressure of from about 10 to 100 bars.

4. A process as claimed in claim 1, wherein the effluent is oxidized with air.

5. A process as claimed in claim 1, wherein the effluent is oxidized with oxygen-enriched air or with technically pure oxygen.

6. A process as claimed in claim 1, wherein the catalyst system also contains $PO_4^{3-}$-ions.

7. A process as claimed in claim 1, wherein oxidation is carried out in the presence of about 5 to 50% of already oxidized effluent preferably 10 vol.-% based on the volume of effluent to be oxidized.

8. A process as claimed in claim 7, wherein the temperature is from about 100° to 250° C., the pressure is from about 10 to 100 bars.